UNITED STATES PATENT OFFICE.

JOSEPH HURFORD, OF SALEM, OHIO, ASSIGNOR TO JOSEPH P. GILL, OF FRANKLIN, INDIANA.

IMPROVED COMPOSITION FOR MAKING ANATOMICAL CASTS.

Specification forming part of Letters Patent No. 53,225, dated March 13, 1866.

*To all whom it may concern:*

Be it known that I, JOSEPH HURFORD, of Salem, in the county of Columbiana and State of Ohio, have invented a new and useful Composition of Matter for Use in the Construction of Anatomical Casts and for other Similar Purposes; and I do hereby declare that the following is a full, clear, and exact description of the same.

The material is intended to be made into casts by the use of porcelain molds or other proper means.

In preparing the composition for making the cast, I take paper reduced to a pulp, and to each pound of pulp I add one ounce of pulverized alum, then place in a common churn, and add hot water until such a state of fluidity is obtained as that the dasher of the churn can be freely agitated, when the whole mass should be thoroughly mixed. The molds being oiled to prevent adhesion, the material thus prepared is pressed in with a sponge, and thus set away to dry.

By this process I am able to make a cheap and light cast entirely free from any gummy or other adhesive mixture, and which will freely receive paint, so that it may be colored to imitate nature.

What I claim as my invention, and desire to secure by Letters Patent, is—

A composition for making casts, compounded and prepared substantially as set forth.

In testimony whereof I have signed my name to this specification in the presence of two subscribing witnesses.

JOSEPH HURFORD.

Witnesses:
R. H. GARRIGUES,
HAYES HURFORD.